Jan. 1, 1935.       R. STRESAU        1,986,167
METHOD OF ELECTRIC ARC WELDING
Filed March 21, 1930
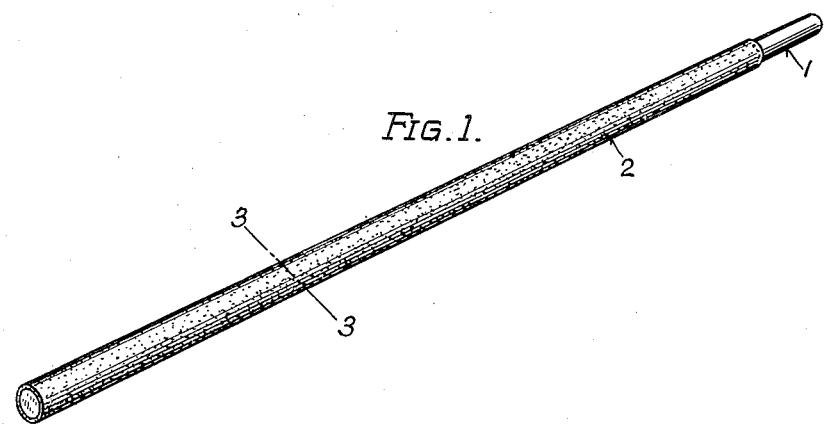
Fig. 1.
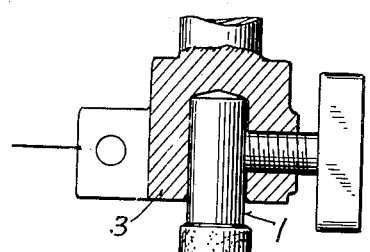
Fig. 2.
Fig. 3.
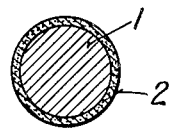
Fig. 4.
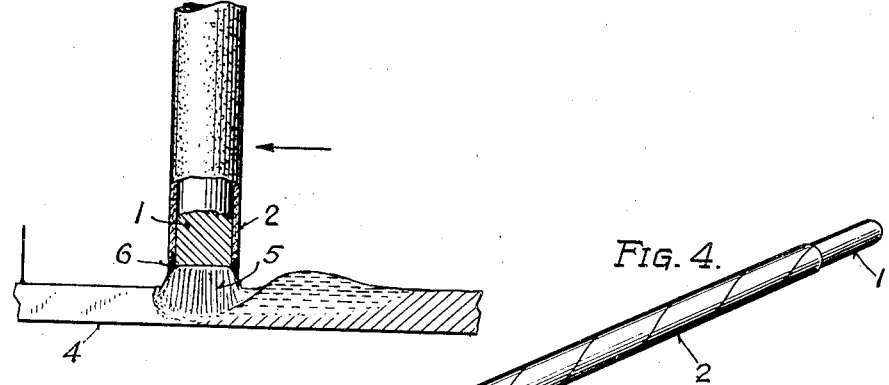
INVENTOR.
Richard Stresau
BY
ATTORNEY.

Patented Jan. 1, 1935

1,986,167

UNITED STATES PATENT OFFICE 1,986,167

METHOD OF ELECTRIC ARC WELDING

Richard Stresau, Wauwatosa, Wis., assignor to A. O. Smith Corporation, Milwaukee, Wis., a corporation of New York Application March 21, 1930, Serial No. 437,722

6 Claims. (Cl. 219—10)

This invention relates to a method of electric arc welding.

It has for its general object the increasing of the speed of arc welding while obtaining a deposit of sound ductile weld metal.

Other objects will appear hereinafter in connection with the preferred embodiments of the invention illustrated in the accompanying drawing.

In the drawing:

Figure 1 is a perspective view of a weldrod.

Fig. 2 is a longitudinal section through the weldrod showing the character of the arc and action obtained in welding.

Fig. 3 is an enlarged transverse section on line 3—3 of Figure 1.

Fig. 4 is a perspective view illustrating a modified form of rod.

The weldrod comprises generally a metallic core or rod 1 and a covering 2 therefor.

In welding, the rod 1 is held at its bare upper end by a clamp 3 which conducts the welding current thereto. The lower end of the rod is then brought into contact with the work 4 and withdrawn therefrom to establish an arc 5 therebetween. When the flow of current has raised the temperature of the metal of the end of the rod 1 to a proper degree, the metal becomes electron-emissive and also begins to vaporize and to be projected through the arc and deposited upon the work 4. The heat of the arc acts upon the covering material to produce therefrom certain protective and arc-confining gases surrounding the arc depending upon the ingredients of the covering.

The covering 2 is preferably composed of a carbohydrate material such as the wood flour covering disclosed in my co-pending application Serial No. 14,939, filed March 12, 1925, and illustrated in Figure 1 hereof, or the starchy covering as set forth in my co-pending application Serial No. 356,182, filed April 18, 1929, or the paper wrapping disclosed in Patent No. 1,301,331 to R. S. Smith and illustrated in Fig. 4 hereof.

The carbohydrate material is decomposed or vaporized by the heat of the arc to provide a reducing gas or gases which surround the arc and protect the metal of the rod 1 which is being projected through the arc from oxidation and contamination.

The covering material is vaporized by the arc at substantially the same rate as the metal is projected from the rod, and the covering residue in the form of carbon provides a rim 6 forming a crater at the arcing end of the weldrod extending downwardly about the arc.

The present invention is based on the discovery that where a weldrod having the characteristics above set forth is made and employed under proper conditions the rate of welding or deposition of metal is increased many times without decreasing the soundness and strength of the weld or deposited metal. For instance, whereas heretofore the deposition of weld metal in commercial practice has not exceeded from 5 to 10 lbs. per hour, the present invention increases the rate of deposition of weld metal many fold, it being possible in the practice of the invention to deposit 70 lbs. of weld metal per hour and common to deposit 35 to 45 lbs. of weld metal per hour under proper conditions. The invention greatly reduces the cost of welding and makes possible the welding of structures six and more inches in thickness in competition with and far in excess of the possibilities of welding processes heretofore practiced.

The increased rate of deposition of weld metal is obtained without sacrificing the requirements of proper fusion of the deposited metal with the metal of the work. The arc prepares the work by forming a crater therein and displacing the metal of the work to provide a large pool of fusing molten weld metal following in the wake of the arc as shown in Fig. 2.

Whereas heretofore weldrods in excess of ¼ inch in diameter were not employed in commercial welding practices, in the present invention a weldrod greatly in excess of ¼ inch in diameter may be employed. The preferable size is from ⅜ to ½ inch although weldrods as large as one and a quarter inches in diameter have been successfully employed.

The thickness of the covering should be correspondingly proportioned to the size of the rod and may be varied according to the composition of the metal of the rod, the composition of the covering, and the welding conditions. In practice it has been found that a ⅜ inch rod should preferably have a covering approximately .042 inch thick while a ½ inch rod should have a covering approximately .050 inch thick.

With a weldrod approximating ½ inch in diameter, arc current values of 45 volts and 800 amperes are employed while with a rod approximating ⅜ inch in diameter the potential across the arc is preferably 40 volts with a current value of about 700 amperes. Higher current values may be employed with larger rods and where a rod of one and a quarter inches in diameter is employed the arc potential may be 55 volts with a current of 2,000 amperes. When weldrods approaching as low as ¼ or 5/16 inch in diameter are employed, current values as low as 400 amperes will give in excess of 10 pounds per hour rate of deposit. However, greater speeds of welding with the same quality may be obtained by employing from 500 to 600 amperes.

Limitations in former welding practices made it impractical to employ such large electrical energies since heretofore a weldrod had not been developed or recognized which would deposit sound weld metal and properly fuse the same with the metal of the work under such high speed welding conditions.

With the present invention, the arc may be struck with a potential source of 60 volts and the welding operations performed at 45 volts. In previous methods and with previous weldrods the arc striking potential was 60 volts with a direct current constant potential source, whereas the arc potential during welding was from 20 to 30 volts. The present invention therefore utilizes from 15 to 25 additional volts in the arc that was formerly wasted in resistances outside of the arc. A phenomenal feature of the invention lies in the fact that, while the arc potential maintained during welding is substantially increased, the potential necessary for striking the arc is low, requiring practically no change in the generator in this respect and making it unnecessary to provide a high resistance in the welding circuit to bridge the gap between the starting and working potentials.

With the present invention the arc length is not a critical factor to good welding and it is easier to maintain the arc without danger of defects in the weld or of interrupting the welding operations. The crater and gases produced at the arcing end of the weldrod substantially prevent the formation of large globules of metal and apparently compel a vapor or ionic transmission of the metal irrespective of the length of the arc, thereby insuring a uniform deposit of weld metal. The employment of large amounts of energy (over four times ordinary usage) with almost perfect arc characteristics results in a rate of welding many times that heretofore employed in commercial practice.

Where the source of welding current is of constant potential characteristics, the saving in working potential above noted is obtained. Where the source of welding current is of constant current characteristics, the relatively short range between the arc striking potential and the working potential enables the generator to provide a quick comeback should the arc become extinguished so as to furnish the required arc striking potential almost immediately after the previous arc has been extinguished. The workman is required to wait a shorter time for the required arc striking potential to be built up before he re-strikes his arc.

The length of the rod is preferably about two feet and is governed by the efficiency of the covering and its ability to withstand heat produced by the resistance of the rod to the flow of the high currents therethrough. In order to prevent premature decomposition of the covering material due to the heat of the rod above the arcing end thereof, it is preferable to provide a combustion retarder such as sodium silicate in the covering.

The weld metal deposited in accordance with the invention is free from oxides, nitrides, and other impurities and has greatly improved ductility and strength values.

The invention may have various embodiments and modifications within the scope of the following claims.

I claim:

1. The method of electric arc welding with a metallic electrode having a heavy covering of a nature to produce a reducing gaseous atmosphere about the arc and a highly refractory crater rim at the arcing end of the electrode for stabilizing the arc and increasing the efficiency of deposit by more largely confining the arc and directing into the weld the metal being deposited, comprising employing an electrode, covered as above, having a diameter between one quarter inch and one half inch and sufficient to prevent excessive heating of the electrode wire and covering distant from the arc when high current values are employed, thereby preserving the covering material for decomposition at the arc, and supplying to the electrode above specified arc current values which will obtain a deposit of sound weld metal of high strength and ductility at a rate approximating from 10 to 40 pounds per hour.

2. The method of electric arc welding with a metallic electrode having a heavy covering containing a cellulosic material of a nature to produce a reducing gaseous atmosphere about the arc and a carbonaceous crater rim at the arcing end of the electrode of a highly refractory nature for stabilizing the arc and increasing the efficiency of deposit by more largely confining the arc and directing into the weld the metal being deposited, comprising employing an electrode, covered as above, having a diameter in excess of one quarter inch and sufficient to prevent excessive heating of the electrode wire and covering distant from the arc when high current values are employed, thereby preserving the covering material for pyrolysis at the arc, and supplying to the electrode above specified arc current values in excess of 400 amperes to obtain a deposit of sound weld metal of high strength and ductility at a rate in excess of 10 pounds per hour.

3. In electric arc welding, the method of supplying to a weld, weld metal at a rate in excess of 10 pounds per hour, comprising using an electric current in excess of 400 amperes with an electrode having a heavy covering containing cellulosic material providing under the action of said electric current a carbonaceous crater rim at the arcing end of the electrode and producing a reducing gaseous atmosphere delivered through said crater rim by pyrolysis of the covering materials, said electrode having a diameter not less than one quarter of an inch.

4. In electric arc welding, the method of supplying to a weld, weld metal at a rate in excess of 10 pounds per hour, comprising using an electric current in excess of 400 amperes with an electrode having a heavy covering containing a material providing under the action of said electric current a highly refractory crater rim at the arcing end of the electrode and producing a reducing gaseous atmosphere about the arc and molten weld metal on the work, said electrode having a diameter not less than one quarter of an inch.

5. The method of electric arc welding with a fusible metallic electrode, comprising employing an electrode having a diameter not less than one-quarter inch, applying thereto a welding current of not less than about four hundred amperes, enveloping the welding arc with a reducing medium, and providing refractory means at the arcing end of the electrode to direct the weld metal therefrom to the work being welded.

6. The method of supplying to a weld, sound weld metal at a rate in excess of ten pounds per hour by electric arc welding with a fusible metallic electrode, comprising applying to the electrode a welding current in excess of four hundred amperes, enveloping the welding arc with a reducing medium capable of preventing contamination of the weld metal, and providing refractory means at the arcing end of the electrode to direct the weld metal therefrom to the work being welded, the electrode having a diameter of not less than about one-quarter of an inch.

RICHARD STRESAU.